United States Patent
Benson et al.

(10) Patent No.: US 7,668,864 B2
(45) Date of Patent: Feb. 23, 2010

(54) DIGITAL LIBRARY SYSTEM WITH CUSTOMIZABLE WORKFLOW

(75) Inventors: Donald Edward Benson, Erie, PA (US); Steven Victor Kauffman, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 10/346,339

(22) Filed: Jan. 17, 2003

(65) Prior Publication Data

US 2004/0143597 A1 Jul. 22, 2004

(51) Int. Cl.
*G06F 17/00* (2006.01)

(52) U.S. Cl. ............... 707/104.1; 707/200; 707/203; 717/115

(58) Field of Classification Search ............... 707/1, 707/4, 8, 9, 10, 101, 102, 103 R, 203, 204, 707/5, 2, 3, 100, 104.1, 200; 709/207, 218, 709/219; 717/120, 115; 702/123; 714/4; 345/619

See application file for complete search history.

(56) References Cited

U.S. PATENT DOCUMENTS

| | | | |
|---|---|---|---|
| 5,937,388 A | 8/1999 | Davis et al. | |
| 5,999,911 A | 12/1999 | Berg et al. | |
| 6,006,195 A | 12/1999 | Marchak et al. | |
| 6,314,434 B1 * | 11/2001 | Shigemi et al. | 707/203 |
| 6,336,137 B1 * | 1/2002 | Lee et al. | 709/219 |
| 6,772,083 B2 * | 8/2004 | Muller et al. | 702/123 |
| 6,785,882 B1 * | 8/2004 | Goiffon et al. | 717/120 |
| 7,385,613 B1 * | 6/2008 | Shukla | 345/619 |
| 2002/0049747 A1 * | 4/2002 | Inohara et al. | 707/2 |

OTHER PUBLICATIONS

Monnard et al., An Object-Oriented Scripting Environment for the WEBSs Electronic Book System, ACM 1992, pp. 81-90.*
Jamison et al., Scripting Distributed Agents, ACM 1999, pp. 18-22.*
P. T. Zellweger, Scripted Documents: a hypermedia path mechanism, 1989, ACM, pp. 1-14.*
Suleman et al., Designing Protocols in Support of Digital Library COmponentization, 2002, ECDL, pp. 568-582.*

* cited by examiner

*Primary Examiner*—Fred I Ehichioya
(74) *Attorney, Agent, or Firm*—Sughrue Mion, PLLC

(57) ABSTRACT

A customizable workflow is specified in a script that is associated with an object that is to be processed by the workflow. Both the object and the script can be stored in a content management system, with the object and script associated with one another by way of identifying the script in metadata stored in the system for the object. The script can be located by locating the object. The script can specify a sequence of a plurality of workflow processes that are performed over the life of the object.

19 Claims, 4 Drawing Sheets

DIGITAL LIBRARY SYSTEM WITH CUSTOMIZABLE WORKFLOW

BACKGROUND OF THE INVENTION

1. Field of the Invention

The invention generally relates to information storage and retrieval computer systems. More particularly, it relates to customizable workflow systems, methods, and articles of manufacture.

2. Description of the Related Art

A content management system is a computer-based infrastructure for managing the full spectrum of digital information. Large collections of scanned images, facsimiles, electronic office documents, XML and HTML files, computer output, audio, video, multimedia, and virtual reality content can be stored and accessed through the content management system. The content management system integrates content with line of business, customer service, enterprise resource planning (ERP), digital asset management, distance learning, World-Wide Web ("Web") content management or other applications to accelerate benefits across the enterprise.

One instance of such a content manager system can be visualized as a triangle, its three vertices being the client, a library server and an object server (resource manager). The client provides the user's interface which gives the user the capability of storing, searching for, and, marking-up documents or other objects. The library server is the equivalent of a card catalog which holds information about the objects, including their location. The object server (OS), also referred to herein as the resource manager (RM) is where either the actual object or a pointer to the actual object is stored.

The core library server logic (except for system utilities and housekeeping tasks) is packaged as a set of relational data base (RDB) stored procedures (SPs) containing embedded SQL statements. Each stored procedure is precompiled and runs on a relational database (RDB) server. Thus, each library server process is a relational database server process. The interface to a library server is SQL, through which either stored procedures can be called or SQL SELECT statements (including cursor support) can be executed. Remote access to the library server is via a relational database client.

The resource managers (RMs) can support different/multiple access protocols. For example, the resource manager, or object server, supports the HTTP protocol. The basic information entities managed by the library server are "items." "Items" as used herein come in two types, simple items and resource items. Resource items can have content associated with them that is stored in one or more resource managers. Resource items point to their content via resource uniform resource locator (URL) related data.

The library server and resource manager, or object server, are separate processes, often running on different machines. In operation, clients first contact the library server to create/update an index for an object, and to determine where the object is to be stored/replaced. The client then sends a request to the resource manager to store/replace the object.

A content management system stores a collection of objects, such as multimedia objects. Such a collection will contain a large number of large objects. One of the central problems with such computing systems is the efficient management of the collection on a set of computers that have limited resources (e.g., processor speed, memory, and disk space). Many computer storage systems use hierarchical storage management (HSM) to provide access to the collection. Storage management policies control the movement of objects from slow inexpensive storage media to fast expensive storage media. These policies provide the necessary storage migration functions, but in many cases these predefined policies do not take full advantage of the workflow components employed in the system, and so they are sub-optimal.

There is a need for workflow systems and techniques that allow the processing behavior of the content management system to be specified depending on the objects being processed, in order to optimize the processing of the object.

SUMMARY OF THE INVENTION

An embodiment of the invention relates to a method of processing an object stored in a data store. The method includes associating a processing script with the object, in which the script specifies a plurality of processing tasks. In response to a request to perform maintenance operations on the object, the script is located by first locating the object, then identifying the script that is associated with that object. The object is then processed by executing the plurality of processing tasks that are specified in the script. The plurality of processing tasks can include a plurality of micro-workflow operations. These scripts are customizable making it easy to specify the processing to be performed to maintain an object stored in the content management system.

Features and advantages of the invention will become apparent upon consideration of the following descriptions and descriptive figures of specific embodiments thereof. While these descriptions go into specific details of the invention, it should be understood that variations may and do exist and would be apparent to those skilled in the art based on the descriptions herein.

DETAILED DESCRIPTION

Figure 1:
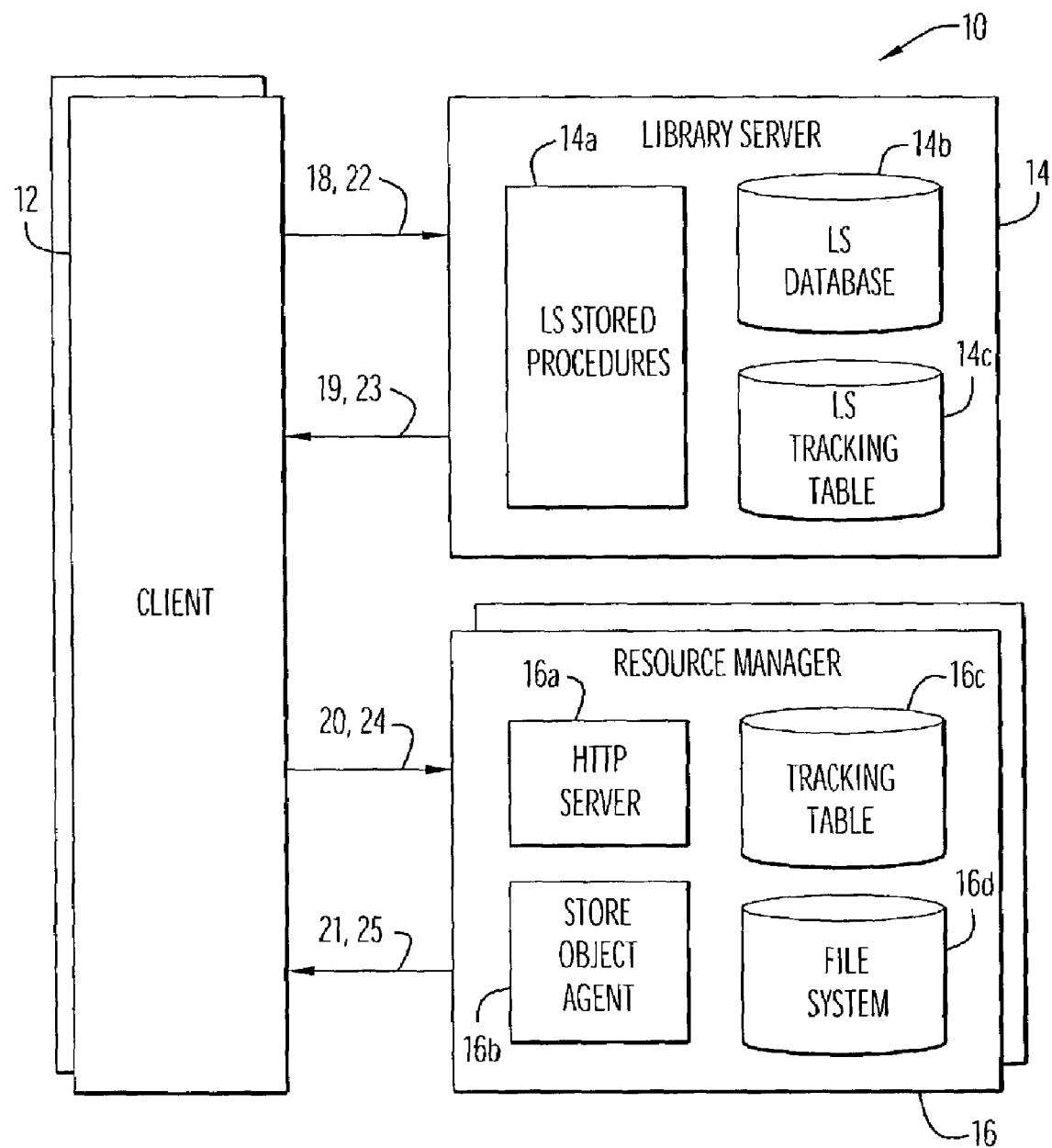
FIG. 1 is a block diagram of a content management system.

The embodiments described below are described with reference to the above drawings, in which like reference numerals designate like components.

A content management system typically includes a set of pre-defined workflows that can operate in an HSM environment, for example, to manage the storage of the object over time. However, those workflows are predefined and do not lend easily themselves to customization, and hence, do not allow customers to easily define workflows for automatically processing objects based on one or more characteristics of those objects. The problems with a conventional content management system can be overcome by using a customizable workflow with the content management system. Such a customizable workflow allows the behavior of the content management system to be specified on the basis of an individual object so that the object is processed in a manner that is appropriate for that object.

Such a customizable workflow is driven by a set of pre-defined processes. An example of such a predefined process is a set of named workflow scripts. Objects, which can be computer files in the content management system, are associated with a script that defines how the content management system will process the object. For example, a script can define certain types of processing to control the object's behavior over it's lifetime.

By using scripts to define the processing steps, new behaviors can be specified by writing new scripts directed to those behaviors. Objects are associated with those scripts to direct the processing of those objects. Such a workflow system can be a component within the content management system in a simple case, or can be a separate, independent component in a larger, more complex system. These workflows can be specified in a variety of ways. For example, workflows can be specified as command files, or they can be generated by a tool with graphical user interface (GUI) dialogs.

The workflows can also define the behavior of indexing of objects. A typical pattern in a content management system is for an asset to be created with a minimal set of properties, then to grow in complexity over time. At some point the object, or asset, stabilizes, then it ages and the enterprise stops using it. HSM policies will move the asset to a less expensive storage media, such as a tape or optical archive, however the indexes associated with the asset will usually be maintained at a fine level of detail. Sometimes that is appropriate, but more often it is optimal to keep only certain basic properties and remove the details from the asset which increases search efficiency. An index management workflow customized to perform those operations can implement that behavior.

Prior to describing the customizable workflows in detail it is helpful to understand the operation of the content management system shown in FIG. 1. Although the content management system shown in FIG. 1 is a client-server system, customizable workflows can be used in systems that do not use a client-server architecture.

The content management system 10 shown in FIG. 1 illustrates one or more clients 12, a library server 14, and one or more resource managers 16, and how they interact to store an item. The library server includes library server stored procedures 14a, a library server database 14b, and a library server tracking table 14c. The resource manager includes an HTTP server 16a, a content management resource manager "Store Object" agent 16b, a resource manager tracking table data base 16c, and a file system 16d.

A given object is defined by an entry in an index or list of objects with a unique identifier that is coupled with searchable attributes, or metadata, including a file or resource manager identifier and a collection identifier. The collection identifier describes how the object is to be managed for storage. A collection is a unit of storage: conceptually a cabinet where objects are placed. It may include many volumes of various storage media and a set of rules as to how the actual objects are stored and handled. The library server 14 and each of the plurality of resource managers 16 are used in the content management system 10 to manage digital content.

The library server 14 holds index, attribute and content information in a searchable form within the library server database 14b, which is a relational database. Generally the library server 14 contains a foldering system and references to data objects that may be stored in a resource manager or in other external file systems. The data objects may be any type of digital information, such as multimedia data.

The library server 14 includes a plurality of tables that are stored in the library server database 14b. The tables include content and administrative information. A resource manager table maintains information concerning the plurality of resource managers. A collection name table holds the names of each collection for each resource manager. A user table holds information concerning each user of the content management system.

The resource managers 16 each have a file system 16d that holds objects as files or references to other storage systems. The resource manager provides for name translation from library server name to file system name/location and for hierarchical storage management and transport of objects. Each of the resource managers 16 also stores meta information that can be held in the file system or in transaction log files. Each resource manager includes an object server table in which a row exists for each object stored and managed by the resource manager. The row identifies the object and maps its identifier to a local filename.

At a high level, the client begins a transaction and returns confirmation to the end user. Next, the client establishes a connection to the library server, and sends requests 18 to the library server to create a catalog entry (as an index entry) for a content management object. In response, the client receives information 19 back from the library server as to where to store the object. For example, the library server returns to the client a URL for the resource manager where the object is to be stored, an object token, and other information. The client then sends a request 20, such as an HTTP request, to the resource manager to store the object. The client receives a response 21 from the resource manager with object metadata. This metadata includes, by way of example, the object name, size, and creation timestamp. The client sends a message 22 with this metadata to the library server. The library server stores the metadata in association with an item identifier for the object. The library server then sends a reply 23 to the client indicating success or failure of the of the metadata update, at which point the client commits the library server updates. After committing the library server updates, the client sends a request 24 to the resource manager to delete its tracking table record. The client receives a reply 25 from the resource manager indicating success or failure in deleting the tracking table entry.

A similar process is followed when the client requests an object stored in the content management system.

Figure 2:
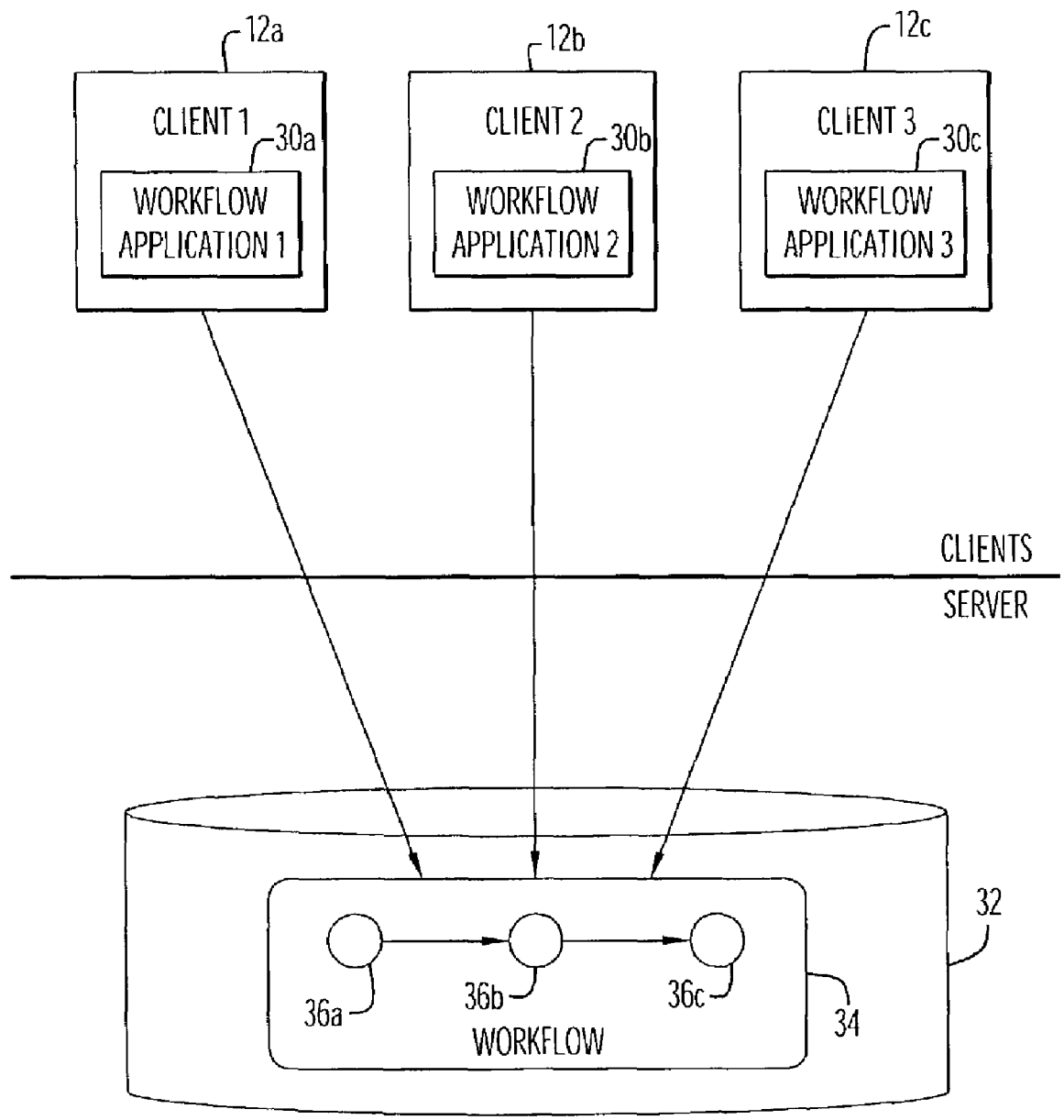
FIG. 2 illustrates a workflow process in a client-server environment.

Content management systems often include a workflow component. Workflow is commonly used to integrate complex systems. An example of a workflow system is shown in FIG. 2. The figure shows a client/server system in which a plurality of clients 12a, 12b and 12c are connected to a workflow server 32. Each of the clients (i.e., clients 1, 2 and 3) contains a workflow application program 30a, 30b and 30c (i.e., workflow application 1, workflow application 2 and workflow application 3). A pre-defined workflow 34 runs in the workflow server 32. The workflow includes workbaskets 36a, 36b and 36c, in which the workflow 34 defines the relations and processing flow between the workbaskets. The workflow applications in the clients place objects to be processed by the workflow in the workbaskets. These workflow applications can monitor the status of the objects through the various stages of the workflow. As can be seen from FIG. 2, the workflow processes objects in a manner external to a storage system.

A customizable micro-workflow incorporates conventional workflow concepts but perform tasks within the content management system. This allows the content management system to be modified without changing the external system architecture. A micro-workflow is similar to a conventional workflow, but takes place within a content management system and is not visible to end users. A user typically submits objects to the content management system and they are stored. From the user's perspective, a conventional workflow involves other people, approvals, or visible movement, while a micro-workflow typically is smaller in scale and imperceptible to an end user because it involves system-level operations in a content management system.

An example of a content management system is a digital video library. One of the most critical resources in a digital video library is file space on a video server. This space is needed to load video content into the system and to play video out. The users of the system often know whether or not a video that has just been loaded will be played again soon, and hence, whether it can be archived immediately. Most HSM systems will archive the oldest material first using a least recently used (LRU) algorithm. Accordingly, recently loaded video content may remain on the video server far longer than is actually needed. Users cope with this by oversizing their servers, or often by employing elaborate schemes to trick the HSM system to force a storage action.

A customizable workflow system tailors a set of micro-workflows to match the needs of the enterprise. The workflows can include actions that involve systems outside the scope of a content management system, such as maintaining records in an accounting system. Employing customizable workflows also provides a mechanism to support complex library operations that are not offered in a standard digital library product, such as supporting multiple copies and migration between libraries.

Although, these functions can be incorporated directly into a content management system, there are a large number of variations of storage management policies and the cost of including those specific policies as part of a product offering has effectively prohibited changes.

Figure 3:
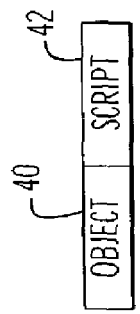
FIG. 3 illustrates a relationship between an object and a workflow script for processing the object.

To facilitate a customizable workflow, an object 40, shown in FIG. 3, within a content management system is associated with a script 42 that defines the micro-workflow processing to be applied to the object. This association can take place by setting an attribute for the object that identifies the script, and recording that attribute in an index for the object in the library server.

Figure 4A:
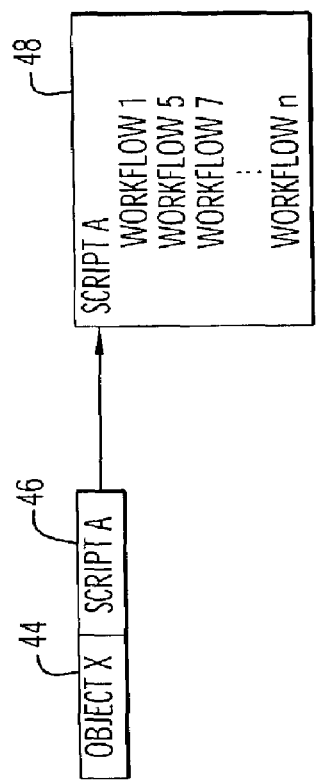
FIGS. 4A and 4B illustrate how a script related to a first object operates to control the processing of that first object.

An example of a script is shown in FIG. 4A. Here, a specific object, Object X (44), is associated with a script identifier 46. As illustrated in FIG. 4A, the script identifier can be a pointer to the script held elsewhere in storage. The actual script, Script A, is held in storage and is illustrated in FIG. 4A by block 48. As shown in the figure, script A defines a sequence of micro-workflows. In this case, script A defines the sequence: Workflow 1, Workflow 5, Workflow 7, . . . , Workflow n.

Figure 4B:
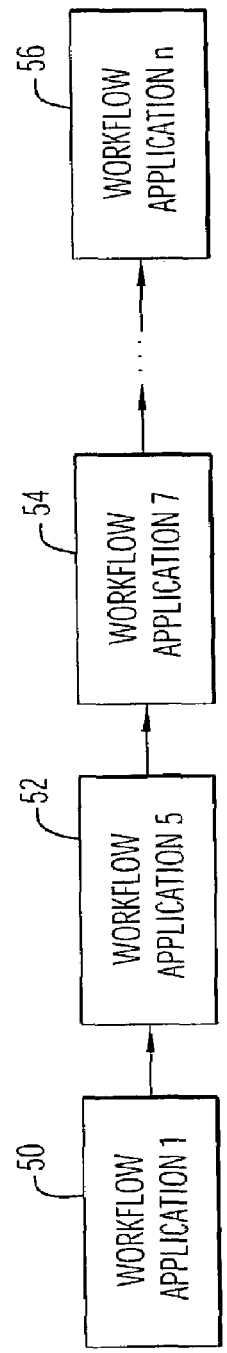

The content management system can process object X over its lifetime by processing the script A. The processing can be initiated automatically by an application program, or alternatively by a user, sending a message to the library server indicating the object to be processed. Such messages can be sent automatically based on a specific time, or based on other criteria. In response to receiving the message the library server retrieves metadata for the object, including information identifying the script associated with the object. The library server then retrieves the script and sends it to a maintenance program. The maintenance program executes the script. For example, FIG. 4B illustrates the processing of Object X based on the Script A associated with it. Script A specifies the processing of Object X. Here, Workflow Application 1 shown in block 50 first processes Object X. Next, Workflow Application 5 shown by block 42 processes the object output from Workflow Application 1. Similarly, Workflow Application 7 illustrated by block 54 next processes the object. This continues until the final workflow specified in the script, here Workflow Application n (56), processes the object.

Figure 5A:
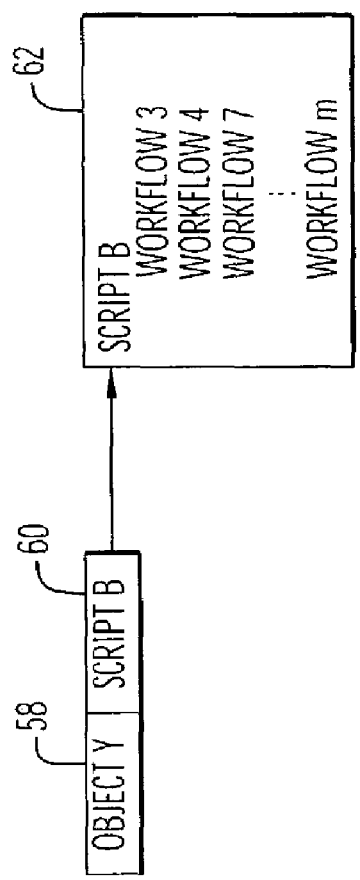
FIGS. 5A and 5B illustrate how another script related to a second object operates to control the processing of that second object.

Each object can be associated with a different script. This is illustrated in FIG. 5A. Here, a different object, namely Object Y (58) is associated with a script identifier (60). Script identifier (60) can be a pointer to the actual script, here Script B, shown by block 62, held elsewhere in storage. As can be seen in FIG. 5A, script B defines a sequence of Workflow Application 3, Workflow Application 4, Workflow Application 7, . . . , Workflow Application m.

Figure 5B:
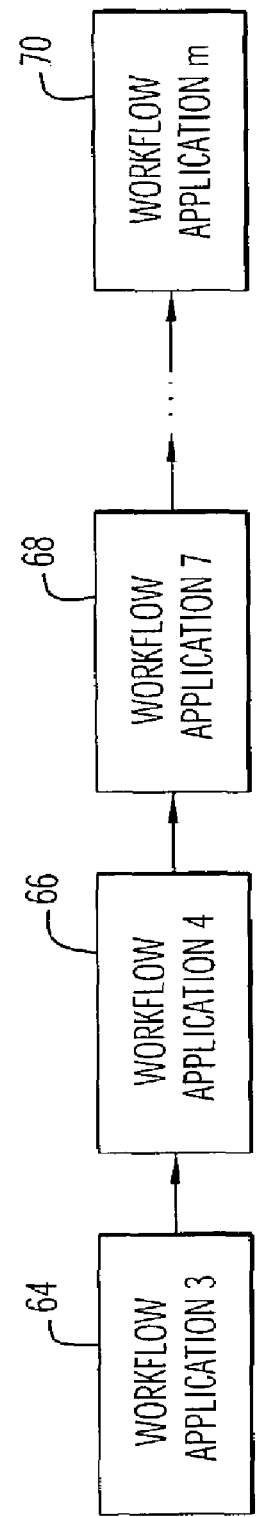

The content management system executes Script B to process Object Y. This process is illustrated in FIG. 5B. Here, Workflow Application 3 illustrated by block 64, first processes Object Y. Next, Workflow Application 4, shown by block 66, next processes the object. Workflow Application 7, shown by block 68, next processes the object. Here it can be seen that the same workflow application can be specified in different scripts. That is, Workflow Application 7 is specified both in Script A and in Script B. The process continues until the final workflow application specified in the script is performed. In this case, Workflow Application m shown by block 70 is performed, the script is complete, and the processing of Object Y is complete.

It should be noted that although the workflow applications illustrated in FIGS. 4B and 5B are illustrated in series, some workflow applications can be processed in parallel, depending on whether the processing lends itself to parallel processing. Some examples of specific micro-workflow actions that can be specified in a workflow script are listed below. The invention is not limited to only the micro-workflow actions listed below.

1. Parse metadata: certain kinds of files (e.g., JPEGS and QuickTime files) have embedded data that can be extracted and indexed for the object.
2. Store to a tape
3. Erase disc file
4. Copy disc file
5. Compress a set of files for a directory into one file (e.g., a TAR or Zip index text file)
6. Open transaction
7. Close transaction
8. Collapse metadata (e.g., replace a set of index entries with a single index entry)

A workflow engine receives a script that specifies a set of the above actions, some of which can be processed in parallel. The workflow engine then performs those actions in the sequence specified in the script, whether that sequence is serial or parallel. A preferred workflow engine uses a database to store the state of the script so that the actions are performed in a consistent manner even if hardware failures occur.

An example of a micro-workflow sequence specified in the script, referring to the workflow actions numbered above, is the sequence of micro-workflow actions: 7 (4, 1, 6), 2, 3 and 8. The steps in parenthesis specify that those micro-workflow actions are run in parallel. According to that sequence, Workflow Action 7 is performed, and after it is performed workflow actions 4, 1, and 6 operate in parallel on the result from 7. When each of those actions is complete, micro-workflow action number 2 is run, etc.

It will be understood that the scripts will specify and pass certain information such as identifiers (IDs) and file names between the various micro-workflow actions. Each of these micro-workflow actions is performed within and by the content management system so that even though these operations take place, they are transparent to end users.

It will be understood that the scripts can be recorded on a computer-readable medium, such as magnetic or optimal discs. Programming instructions to process the scripts can be recorded on similar computer-readable media.

Having described apparatuses, articles of manufacture and methods of a customizable workflow, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A computer-implemented method of processing an object stored in a data store, comprising a processor performing:
    selecting a processing script from among a plurality of processing scripts based on characteristics of the object;
    providing an identifier of the selected script and associating the script with the object by storing the identifier of the script in metadata associated with the object, wherein the script specifies a plurality of processing tasks, and by generating the processing script by specifying predefined micro-workflow processes;
    in response to a request to process the object, locating the script, comprising:
        locating the object,
        obtaining the identifier of the script in the metadata, and
        using the identifier of the script to locate the script;
    processing the object by executing the plurality of processing tasks as specified in the script; and
    customizing the script by changing the plurality of processing tasks, wherein the plurality of processing tasks is changed by changing a specification defining an order of processing the plurality of tasks.

2. The method of claim 1, wherein the plurality of processing tasks includes a plurality of micro-workflow operations.

3. The method of claim 1, wherein the data store is a content management system.

4. The method of claim 3, wherein the object is a multimedia object containing multimedia information.

5. The method of claim 1, wherein the processing script is generated using a graphical user interface (GUI).

6. The method of claim 1, wherein the processing script specifies executing at least two of the plurality of processing tasks in parallel.

7. The method of claim 1, wherein the plurality of processing tasks is comprised of at least one of:
    parsing metadata contained in the object by extracting the metadata and indexing the extracted metadata in association with the object;
    storing the object to a tape storage medium;
    copying a disc file containing the object;
    erasing a disc file containing the object;
    compressing a set of computer files in a directory into a single computer file;
    opening a transaction associated with the object;
    closing a transaction associated with the object; and
    collapsing a plurality of metadata items associated with the object into a single metadata item.

8. A program product embodied on a computer readable medium of instructions for processing an object stored in a data store, comprising:
    program instructions for selecting a processing script from among a plurality of processing scripts based on characteristics of the object;
    program instructions for providing an identifier of the selected script and associating the script with the object by storing the identifier of the script in metadata associated with the object, wherein the script specifies a plurality of processing tasks;
    program instructions for locating the script in response to a request to process the object, the locating comprising:
        locating the object,
        obtaining the identifier of the script in the metadata, and
        using the identifier of the script to locate the script;
    program instructions for processing the object by executing the plurality of processing tasks as specified in the script;
    program instructions for customizing the script by changing the plurality of processing tasks, wherein the plurality of processing tasks is changed by changing a specification defining an order of processing the plurality of tasks;
    wherein said program instructions for associating a processing script with the object comprises program instructions for generating the processing script by specifying predefined micro-workflow processes.

9. The program product of claim 8, wherein the plurality of processing tasks include a plurality of micro-workflow operations.

10. The program product of claim 8, wherein the data store is a content management system.

11. The program product of claim 10, wherein the object is a multimedia object containing multimedia information.

12. The program product of claim 8, wherein said program instructions for associating a processing script with the object comprises program instructions for generating the processing script by specifying predefined micro-workflow processes.

13. The program product of claim 12, wherein the processing script is generated using a graphical user interface (GUI).

14. The program product of claim 8, wherein the processing script specifies executing at least two of the plurality of processing tasks in parallel.

15. The program product of claim 8, wherein the plurality of processing tasks is comprised of at least one of:
    parsing metadata contained in the object by extracting the metadata and indexing the extracted metadata in association with the object;
    storing the object to a tape storage medium;
    copying a disc file containing the object;
    erasing a disc file containing the object;
    compressing a set of computer files in a directory into a single computer file;
    opening a transaction associated with the object;
    closing a transaction associated with the object; and
    collapsing a plurality of metadata items associated with the object into a single metadata item.

16. A computer-implemented apparatus for processing an object stored in a data store, comprising:
    a processing unit configured to select a processing script from among a plurality of processing scripts based on characteristics of the object, to provide an identifier of the selected script, and to associate the script with the object by storing the identifier of the script in metadata associated with the object by selecting;

a metadata storage unit configured to store the metadata associated with the object, the metadata including the identifier of the script for processing the object; and a processing unit configured to locate the script by locating the object, obtaining the identifier of the script included in the metadata storage unit, and locating the script using the identifier, in response to a request to process the object, and to execute the script to process the object; and further comprising a graphical user interface (GUI) for customizing the script by changing the plurality of processing tasks, wherein the plurality of processing tasks is changed by changing a specification defining an order of processing the plurality of tasks;

wherein said processing unit associates the script with the object by generating the processing script by specifying predefined micro-workflow processes.

17. The apparatus of claim 16, wherein the plurality of processing tasks includes a plurality of micro-workflow operations.

18. The apparatus of claim 16, wherein the data store is a content management and the object is a multimedia object containing multimedia data.

19. The apparatus of claim 16, further comprising a script association unit configured to associate the script with the object by including an identifier of the script in the metadata associated with the object.

* * * * *